United States Patent
Pitzer et al.

(10) Patent No.: US 9,861,111 B2
(45) Date of Patent: Jan. 9, 2018

(54) METHOD AND MACHINE FOR PRODUCING SAUSAGE-SHAPED PRODUCTS

(71) Applicant: Poly-clip system GmbH & Co. KG, Hattersheim (DE)

(72) Inventors: Reinhard Pitzer, Wiesbaden (DE); Martin Zurwieden, Sassenberg (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 15/453,643

(22) Filed: Mar. 8, 2017

(65) Prior Publication Data
US 2017/0258100 A1 Sep. 14, 2017

(30) Foreign Application Priority Data
Mar. 9, 2016 (EP) ..................... 16159498

(51) Int. Cl.
*A22C 11/00* (2006.01)
*A22C 11/02* (2006.01)
*A22C 11/12* (2006.01)

(52) U.S. Cl.
CPC ........ *A22C 11/0263* (2013.01); *A22C 11/125* (2013.01)

(58) Field of Classification Search
CPC ....... A22C 11/00; A22C 11/008; A22C 11/02; A22C 11/0209; A22C 11/0227; A22C 11/0263
(Continued)

(56) References Cited

U.S. PATENT DOCUMENTS 4,437,209 A * 3/1984 Duroyon ............ A22C 11/0218
452/32
4,438,545 A * 3/1984 Kupcikevicius ... A22C 11/0218
138/118.1
(Continued)

FOREIGN PATENT DOCUMENTS

CH 682440 A5 9/1993
DE 2645714 B1 11/1977
(Continued)

OTHER PUBLICATIONS

Extended European search report issued in corresponding European Application No. 16159498.1 dated Sep. 20, 2016 (8 pages).

*Primary Examiner* — Richard Price, Jr.
(74) *Attorney, Agent, or Firm* — Fitch Even Tabin & Flannery LLP

(57) ABSTRACT

The present invention relates to a method for producing sausage-shaped products, like sausages, containing a flowable filling material in a tubular or bag-shaped packaging casing, on a clipping machine, and a clipping machine for producing sausage-shaped products. The method comprises the steps of feeding the filling material in a feeding direction into the tubular or bag-shaped packaging casing stored on a filling tube and being closed at the front end by a closure means, like a closing clip, limiting the movement of the tubular or bag-shaped packaging casing while being pulled-off from the filling tube by a casing brake assembly arranged on the filling tube, gathering the filled tubular or bag-shaped packaging casing by gathering means arranged downstream the filling tube, for forming a plait-like portion thereto, and placing and closing at least one closure means on the plait-like portion for closing the filled tubular or bag-shaped packaging casing. Moreover, the casing brake assembly is
(Continued)

moved along the filling tube during the feeding filling material into the tubular or bag-shaped packaging casing.

7 Claims, 2 Drawing Sheets

(58) Field of Classification Search
USPC .............. 452/21–26, 30–32, 35–37, 46–48
See application file for complete search history.

(56) References Cited

U.S. PATENT DOCUMENTS

| | | | | |
|---|---|---|---|---|
| 4,646,386 A | * | 3/1987 | Dreisin | A22C 11/0245 452/31 |
| 5,152,712 A | * | 10/1992 | Nausedas | A22C 11/0209 452/33 |
| 5,197,914 A | | 3/1993 | Powers | |
| 5,743,792 A | * | 4/1998 | Hanten | A22C 11/0245 452/29 |
| 5,916,019 A | | 6/1999 | Whittlesey | |
| 6,050,888 A | * | 4/2000 | Nakamura | A22C 11/107 452/47 |
| 7,666,072 B2 | * | 2/2010 | Schalk | A22C 11/12 452/48 |
| 8,376,002 B2 | | 2/2013 | Jens | |
| 2002/0137451 A1 | * | 9/2002 | Kasai | A22C 11/0245 452/32 |
| 2008/0014847 A1 | * | 1/2008 | Waldstaedt | A22C 11/105 452/32 |
| 2008/0261500 A1 | | 10/2008 | Fogler et al. | |
| 2012/0142261 A1 | * | 6/2012 | Hanten | A22C 11/0245 452/37 |
| 2015/0093980 A1 | * | 4/2015 | Wiemer | A22C 11/125 452/48 |
| 2015/0223478 A1 | * | 8/2015 | Ebert | A22C 11/125 452/35 |
| 2016/0095326 A1 | * | 4/2016 | Ebert | A22C 11/125 452/35 |

FOREIGN PATENT DOCUMENTS

| | | |
|---|---|---|
| EP | 1764000 A1 | 3/2007 |
| EP | 2323491 B1 | 6/2013 |

* cited by examiner

METHOD AND MACHINE FOR PRODUCING SAUSAGE-SHAPED PRODUCTS

CROSS-REFERENCE TO RELATED APPLICATION

The present application claims the benefit of priority of European Patent Application No. 16159498.1 filed Mar. 9, 2016, the contents of which are incorporated herein by reference in their entirety.

FIELD

The present invention relates to a method for producing sausage-shaped products, like sausages, containing a flowable filling material in a tubular or bag-shaped packaging casing, and a clipping machine on which said method may be executed.

BACKGROUND OF THE INVENTION

In practice, it is known that, for example in the production of sausage-shaped products, like sausages, filling material is fed by a filling machine through a filling tube of a clipping machine into a tubular or bag-shaped packaging casing which is stored on the filling tube and which is closed at its front end, i.e. the end pointing in the feeding direction of the filling material by a closing clip. The tubular or bag-shaped packaging casing is pulled-off from the filling tube while being filled by the feeding pressure. A casing brake is positioned in the region of the front end of the filling tube, i.e. the end of the filling tube facing in feeding direction, in order to apply a frictional force to the tubular or bag-shaped packaging casing while being pulled-off from the filling tube.

After a predetermined volume of filling material has been filled into said tubular or bag-shaped packaging casing, a displacer arrangement with a first and a second displacer unit which can each be formed by a pair of reversibly moveable displacement elements, gathers the filled tubular or bag-shaped packaging casing and shapes a plait-like portion thereto. The clipping machine then places and closes at least one closing clip at the plait-like portion forming the rear end of the sausage shaped product, i.e. the end pointing against the feeding direction by respective closing tools which are reversibly movable towards the plait-like portion.

In known clipping machines, the casing brake is positioned a distance upstream the front end of the filling tube such that the brake element of the casing brake is positioned on the filling tube in order to enable the casing brake to apply a defined frictional force to the tubular or bag-shaped packaging casing, and to provide a space between the inner surface of the tubular or bag-shaped packaging casing and the outer surface of the front end of the filling tube into which filling material may be displaced, particularly during the closing operation.

Such a clipping machine is known from EP patent application 2 323 491 in which the casing brake is arranged on the filling tube in a fixed position during the production process. For refilling tubular casing onto the filling tube, the casing brake may be removed from the filling tube by pivoting the filling tube together with the casing brake out of its working position and by reversibly drawing-off the casing brake assembly from the filling tube.

From EP patent application 1 764 000, a clipping machine is known which includes a casing brake having a holder for holding a brake ring. The holder together with the brake ring is coupled to a drive, and is reciprocally movable along the filling tube of the clipping machine by said drive. During the closing operation, particularly during the forming of a plait-like portion to the filled tubular casing, the brake ring is moved along the filling tube opposite to the feeding direction, in order to provide additional space between the tubular casing and the outer surface of the filling tube for accommodating the filling material displaced while gathering the filled tubular casing and forming a plait-like portion thereto. After the closing operation has been finished, the holder is moved in the feeding direction into its starting position close to the front end of the filling tube.

Dependent on the kind of filling material, and further dependent on the size of the available additional space between the inner surface of the tubular or bag-shaped packaging casing and the outer surface of the filling tube in the region of its front end, a portion of the filling material which enters said additional space, may remain there, e.g. adhering at the filling tube. Thereby, the quality of the sausage-shaped products may be affected.

It is an object of the present invention to provide a method for producing sausage-shaped products and a machine, like a clipping machine, which overcome the above mentioned drawbacks, and by means of which sausage-shaped products of high quality may be produced.

SUMMARY OF THE INVENTION

According to the present invention, there is provided a method for producing sausage-shaped products, like sausages, containing a flowable filling material in a tubular or bag-shaped packaging casing, on a clipping machine. The method comprises the steps of feeding the filling material in a feeding direction into the tubular or bag-shaped packaging casing stored on a filling tube and being closed at the front end by closure means, like a closing clip, limiting the movement of the tubular or bag-shaped packaging casing while being pulled-off from the filling tube by a casing brake assembly arranged on the filling tube, gathering the filled tubular or bag-shaped packaging casing by gathering means arranged downstream the filling tube, for forming a plait-like portion thereto, and placing and closing at least one closure means on the plait-like portion for closing the filled tubular or bag-shaped packaging casing.

In the inventive method, the casing brake assembly is, reversibly moved in the feeding direction of the filling material along the filling tube during the feeding of the filling material into the tubular or bag-shaped packaging casing.

This movement of the casing brake assembly during the filling process which is preferably controlled by control means, like a control unit, allows varying the size of the available space formed between the inner surface of the tubular or bag-shaped packaging casing, the outer surface of the front end of the filling tube, the front end of the filling tube and the casing brake assembly. Thereby, the amount of filling material entering said available space during the filling process, may be controlled, e.g. in adaption to the kind of filling material and its consistency, for preventing filling material from remaining in said available space, and for a controlled removing of said filling material out of said available space. Furthermore, smearing of filling material at the inner surface of the tubular or bag-shaped packaging casing may be reduced or omitted, whereby, in particular when using transparent casing material, the original structure of the filling material remains visible.

In a preferred embodiment of the inventive method, the casing brake assembly may be shifted along the filling tube during the filling process between two predefined positions, a first position close to the front end of the filling tube, and a second position in a predefined distance to the first position and upstream thereto.

It may be possible to predefine only the first position, and to determine the second position on the basis of the kind of sausage-shaped products to be produced, like the size of the products and/or the kind of the filling material and/or the casing material.

In a further advantageous embodiment of the inventive method, during the feeding of the filling material into the tubular or bag-shaped packaging casing, the casing brake assembly is moved in feeding direction between a retracted position in which the casing brake assembly is positioned in a predefined distance upstream the front end of the filling tube, which is the first position, and a forward position in which the casing brake assembly is positioned in closed vicinity to the front end of the filling tube, which is the second position.

Thereby, the available space for the filling material urged in the region formed between the outer surface of the filling tube and the inner surface of the packaging casing as well as the front end of the filling tube and the casing brake assembly, may continuously or discontinuously be reduced, for controlling the amount of filling material entering this available space, and for preventing filling material from adhering at the outer surface of the filling tube.

The movement of the casing brake assembly along the filling tube during the filling process may be controlled on the basis of various data and/or variables of the production process. In a preferred configuration, the casing brake assembly is moved along the filling tube for a predefined time period. Alternatively or additionally, it is also possible that the casing brake assembly is moved along the filling tube with or at a predefined velocity profile. The casing brake assembly may thereby continuously or discontinuously be moved along the filling tube. As an example, the movement speed of the casing brake assembly along the filling tube may be adapted to the feeding speed of the filling material. The adaption of the movement of the casing brake assembly along the filing tube during the filling process allows the production of sausage-shaped products of high quality.

In accordance with the kind of sausage-shaped products to be produced, in a further preferred configuration, the casing brake assembly is moved along the filling tube during a portion of a feeding cycle for producing one unit of a sausage-shaped product. Alternatively, the casing brake assembly is moved along the filling tube during a complete feeding cycle for producing one unit of a sausage-shaped product. This allows a further adaption of the production process to different kinds of casing materials and/or filling material.

It has to be understood that the movement of the casing brake assembly along the filling tube during the filling process may be controlled additionally or alternatively in accordance with the feeding of filling material, e.g. by adapting the movement speed of the casing brake assembly to a continuous or discontinuous feeding speed of filling material.

According to the present invention, there is further provided a clipping machine for producing sausage-shaped products, like sausages, containing a flowable filling material in a tubular or bag-shaped packaging casing. The clipping machine comprises a filling tube for feeding filling material into the tubular or bag-shaped packaging casing stored on the filling tube and being closed at the front end by closure means, like a closing clip, a casing brake assembly arranged on the filling tube, for limiting the movement of the tubular or bag-shaped packaging casing while being pulled-off from the filling tube, gathering means for gathering the filled tubular or bag-shaped packaging casing and for forming a plait-like portion thereto, and a clipping device for placing and closing at least one closure means on the plait-like portion. The inventive clipping machine further comprises a guide device for reversibly guiding the casing brake assembly along the filling tube in a feeding direction of the filling material during the feeding of the filling material into the tubular or bag-shaped packaging casing, and a control unit adapted to control the movement of the casing brake assembly along the filling tube at least during the feeding of the filling material into the tubular or bag-shaped packaging casing.

The inventive clipping machine allows, among others, executing the inventive method for producing sausage-shaped products, and thereby provides the same advantages as explained above in conjunction with the inventive method.

Further advantages and preferred embodiments will be described in the following together with the drawings listed below. The expressions "left", "right", "below" and "above" used in the following description, are referred to the drawings in an alignment such that the reference numbers and the notation of the drawing used can be read in normal orientation.

DETAILED DESCRIPTION

Figure 1:
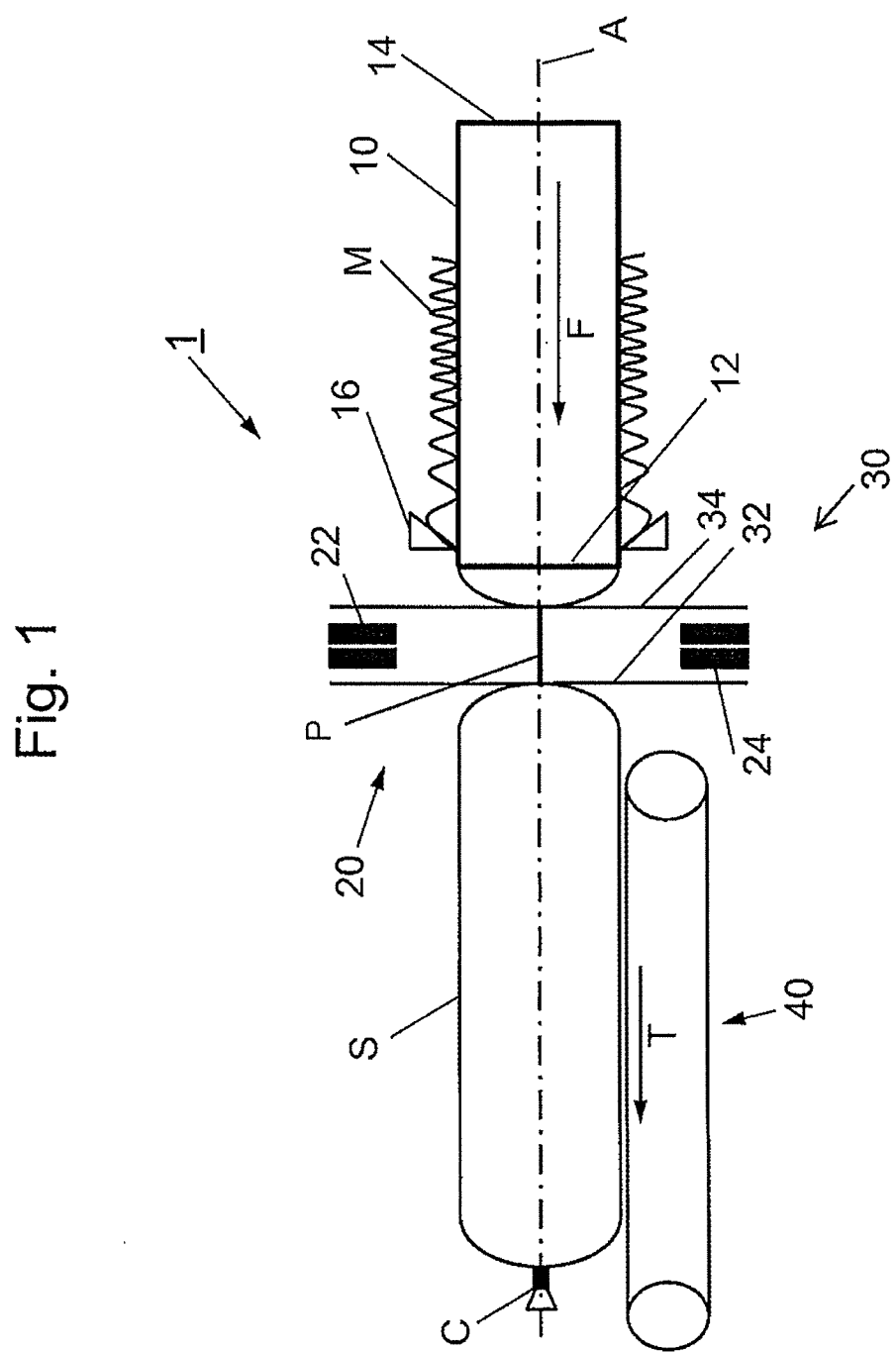
FIG. 1: is a schematic view to a clipping machine according to the present invention, wherein the tubular casing is filled and gathered.

A clipping machine 1 for producing sausage-shaped products S shown in FIG. 1, comprises, as main components, a filling tube 10 having a longitudinally extending central axis A, with a discharge opening for a filling material at its left end 12 and a feeding opening for the filling material fed to the filling tube 10, for example a feeding pump, at its right end 14, a casing brake assembly 16 arranged coaxially with filling tube 10 in the region of left end 12 of filling tube 10. Filling tube 10 is made of a suitable material, like stainless steel.

A supply of tubular packaging casing M made of a thin sheet material is stored on filling tube 10. From the supply of tubular packaging casing material M, a portion of packaging casing M is pulled-off during the process of manufacturing sausage-shaped products S.

Right end 14 of approximately horizontally arranged filling tube 10 is coupled to a filler arrangement (not shown in FIG. 1) including a pump for feeding filling material through filling tube 10 in a feeding direction F into tubular packaging casing M closed on its front end facing in feeding direction F, by a closure clip C.

Clipping machine 1 further comprises a clipping device 20 for closing a filled portion of tubular packaging casing M by applying closure means, like closure clips C, to a plait-like portion P, and gathering means 30 for gathering the filled tubular packaging casing M and for forming said plait-like portion P thereto. These units are all arranged downstream filling tube 10.

As can be inferred from FIG. 1, positioned immediately downstream left end 12 of filling tube 10, clipping device 20 is arranged and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the just filled tubular packaging casing M for forming a sausage-shaped product S, and a second closure clip C for closing the front end of the tubular packaging casing M subsequently to be filled.

Gathering means 30 includes a first displacer unit 32 and a second displacer unit 34, wherein first displacer unit 32 is positioned downstream second displacer unit 34, and wherein each of first and second displacer unit 32, 34 include at least an upper and a lower displacer element. First and second clipping tools 22, 24 of clipping device 20 may be positioned between first and second displacer units 32, 34, at least for applying and closing one or two closure clips C to plait-like portion P.

Furthermore, for discharging a sausage-shaped product S just produced from clipping machine 1, downstream clipping device 20, a transportation device like a belt conveyor 40 may be arranged, which can comprise a conveyor belt and guide rollers. Transportation direction T of belt conveyor 40 at least approximately coincides with feeding direction F. The height of the upper conveyor belt section of belt conveyor 40 is aligned to the lower side of the sausage shaped product S just produced and discharged from clipping machine 1.

Figure 2:
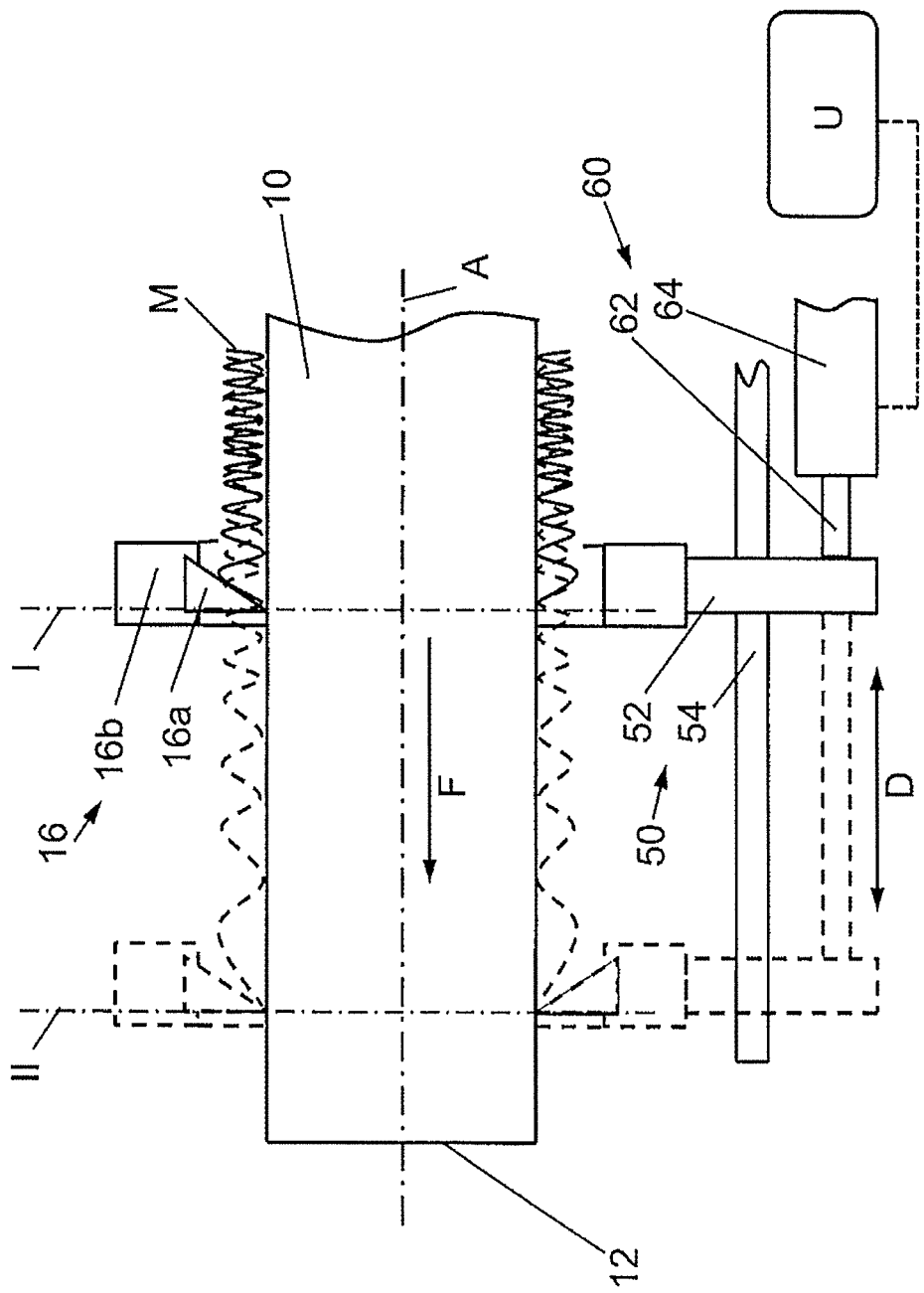
FIG. 2: is a detailed view to the casing brake assembly of the clipping machine according to FIG. 1.

Casing brake assembly 16, as shown in FIG. 2, includes at least one brake element 16a circumferentially arranged on filling tube 10, and a holder 16b for supporting and moving brake element 16a along filling tube 10. Brake element 16a has the form of a ring including a brake lip directed towards filling tube 10, and acting on tubular casing material M along an approximately circular line surrounding tubular casing material M.

Holder 16b of casing brake 16 is coupled to a guide device 50 by means of which casing brake assembly 16 is guided along filling tube 10 between a first position I and a second position II. In second or forward position II, casing brake assembly 16 is positioned close to left end 12 or the front end of filling tube 10. In first or retracted position I, casing brake assembly 16 is positioned a predefined distance upstream forward position II.

Guide device 50 includes a coupling element 52 to which holder 16b of casing brake assembly 16 is coupled, and a guide element 54 along which coupling element 52 may be moved for guiding casing brake 16 along filling tube 10. Guide element 54 which, in the embodiment of FIG. 2, has the form of a longitudinally extending bar, is arranged approximately parallel to filling tube 10.

A drive 60 is connected to coupling element 52 for reversibly shifting coupling element 52 along guide element 54 in shifting directions D, and thus, moving casing brake 16 along filling tube 10. Drive 60, according to FIG. 2, is a piston/cylinder drive which includes a piston 62 linearly reversely movable in a cylinder 64. The free end of piston 62 which is the left end in FIG. 2, is connected to coupling element 52 of guide device 50. Drive 60 is arranged approximately parallel to guide element 54 ant laterally thereto.

In FIG. 2, casing brake assembly 16, together with coupling element 52 and piston 62, is shown in first or retracted position I in solid lines, and in second or forward position II in dotted lines.

As indicated in FIG. 2, drive 60 is connected to a control unit U which controls drive 60. It has to be understood that control unit U may control all functions of clipping machine 1, and may further include a sub-unit or the like, for controlling drive 60.

For producing a sausage shaped product S on clipping machine 1, tubular casing M stored on filling tube 10 and closed at its front end by a closure clip C, is filled with filling material which is fed through filling tube 10 into tubular casing M in feeding direction F. After a predetermined portion of filling material has been fed into tubular casing M, first and second displacer units 32, 34 are moved from their opened position, in which the displacer elements of first and second displacer units 32, 34 are at their maximum distance to each other, into their closed position in which the displacer elements are at their minimum distance to each other, for gathering filled tubular casing M. Thereafter, second displacer unit 32 carries out a linear movement in a horizontal plane and coaxially to feeding direction F. Thereby, a plait-like portion P is formed to gathered tubular casing material M, and two closure clips C are applied to plait-like portion P and closed by clipping device 20, a first closure clip C for closing just filled tubular casing M for forming a sausage-shaped product S and a second closure clip C for closing the front end of sausage-shaped product S subsequently to be produced. A cutting mechanism may be provided, which cuts tubular casing M between the two closure clips C for severing sausage-shaped product S just produced from remaining tubular casing M. Sausage-shaped product S just produced is discharged from clipping machine 1 by belt conveyor 40.

In the method for producing sausage-shaped products S, according to the present invention, casing brake assembly 16 may be shifted or moved in the feeding direction F along filling tube 10 during feeding filling material into the tubular packaging casing M.

At the beginning of the process for producing a sausage-shaped product S, casing brake assembly 16 is arranged in first or retracted position I. Simultaneously with or a pre-defined time after the feeding of filling material through filling tube 10 into tubular casing material M has been started, e.g. synchronized with a pump of a filler, drive 60 is started which is controlled by control unit U. Casing brake assembly 16 is shifted in feeding direction F towards the second or forward position II, which is reached synchronously with or after feeding of filling material has been stopped after a predefined portion of filling material has been fed into tubular casing M. Thereafter, casing brake assembly is shifted or moved back into first or retracted position II for starting the next filling cycle, e.g. during the closing step for the just filled casing portion.

Drive 60 is operated on the basis of selected data, e.g. regarding the kind of sausage-shaped products S to be produced, like tightly or slack filled sausages, and/or the kind of filling material and/or casing material, like more or less viscous filling material or more or less stiff casing material. Drive 60, alternatively or additionally to the selected data, may be controlled on the basis of a predefined velocity profile, for being driven with a constant speed or a varying speed.

In a simple case, the size of sausage-shaped products, e.g. its length and diameter, is correlated with the volume flow of the filler, and drive 60 is driven on a constant speed during the complete feeding process such that at the end of the feeding process, casing brake assembly 16 reaches second or forward position II and drive 60 is stopped.

Alternatively, drive 60 driven on a constant speed, is started a predefined time after the feeding of filling material has been started, and is stopped a predefined time before the end of the feeding process. Thereby, the differences in size between the end portions and the middle portion of a sausage-shaped product S may be regarded.

Drive 60 may be controlled additionally or alternatively on the basis of a predefined velocity profile. The velocity profile may include a first section in which the speed of the movement of casing brake assembly 16 increases from zero to a predefined speed level which is maintained constant over a second section, and a third section in which the speed is reduced from the predefined speed level to zero. It has to be understood that, dependent on the data selected for controlling drive 60, a velocity profile may have only one or two sections, or more than three sections, and that the speed in one of the sections may vary, like increasing and decreasing or oscillating about an average value.

Furthermore, it is also possible that only first or retracted position I is specified as the starting point for the filling operation. Second or forward position II may vary dependent on the selected data regarding the production process and sausage-shaped products S to be produced, e.g. by selecting a length for the shifting path of casing brake assembly 16. In other words, not only the speed of casing brake assembly 16 while being shifted or moved along filling tube 10, may vary, but also the length of the shifting path along filling tube 10.

It has to be understood that a securing device may be provided, for preventing casing brake 16 from being shifted-off of filling tube 10 during the feeding process.

Such a securing device may be realized by a sensor (not shown) positioned in the region of front end 12 of filling tube 10, which may sense the position of casing brake assembly 16 and/or guide element 52, and which interacts with control unit U for stopping drive 60 in case that casing brake assembly 16 and/or guide element 52 have reached a predefined end position on filling tube 10.

Alternatively or additionally, a securing device may be implemented in control unit U for monitoring the operation of drive 60. Thereby, the length of the shifting path may be estimated, and when reaching an allowed maximum value, drive 60 may be stopped.

It has to be understood that casing brake assembly 16 as shown in FIGS. 1 and 2 above, is only one possible embodiment of a casing brake assembly. The inventive clipping machine 1 may include a casing brake assembly 16 of a design different from casing brake assembly 16. Naturally, also the inventive method may be executed using a casing brake assembly 16 of a design different from casing brake assembly 16 according to FIGS. 1 and 2.

As explained above, tubular packaging casing material M, stored on filling tube 10, is used for producing sausage-shaped products S. However, also bag-shaped packaging casing may be filled according to the inventive method. In this case, after a sausage-shaped product S has been produced, the next bag-shaped packaging casing has to be positioned on filling tube 10, and casing brake assembly 16 has to be positioned in first or retracted position I for starting the filling operation.

It has further to be noted that a guide device 50, presently realized by coupling element 52 and guide element 54, may also be realized in any other suitable way. It is possible that drive means 60, and in particular piston 62, is directly coupled to holder 16a or any other suitable part of casing brake assembly 16. A guide device is thereby incorporated in drive 60.

Furthermore, drive 60 may also include any other suitable drive element, like a pneumatic piston/cylinder arrangement or an electric motor, and additionally a suitable gear for adapting the speed of drive 60.

What is claimed is:

1. A method for producing sausage-shaped products, containing a flowable filling material in a tubular or bag-shaped packaging casing, on a clipping machine, the method comprises the steps of:
   feeding the filling material in a feeding direction into the tubular or bag-shaped packaging casing stored on a filling tube and being closed at the front end by closure means, like a closing clip;
   limiting the movement of the tubular or bag-shaped packaging casing while being pulled-off from the filling tube by a casing brake assembly arranged on the filling tube;
   gathering the filled tubular or bag-shaped packaging casing by gathering means arranged downstream the filling tube, for forming a plait-like portion thereto;
   placing and closing at least one closure means on the plait-like portion for closing the filled tubular or bag-shaped packaging casing;
   wherein the casing brake assembly is reversibly moved in the feeding direction along the filling tube during the feeding of the filling material into the tubular or bag-shaped packaging casing.

2. The method according to claim 1, wherein, during the feeding of the filling material into the tubular or bag-shaped packaging casing, the casing brake assembly is moved in feeding direction between a retracted position in which the casing brake assembly is positioned in a predefined distance upstream the front end of the filling tube, and a forward position in which the casing brake assembly is positioned in closed vicinity to the front end of the filling tube.

3. The method according to claim 1, wherein the casing brake assembly is moved along the filling tube for a predefined time period.

4. The method according to claim 1, wherein the casing brake assembly is moved along the filling tube with a predefined velocity profile.

5. The method according to claim 1, wherein the casing brake assembly is moved along the filling tube during a portion of a feeding cycle for producing one unit of a sausage-shaped product.

6. The method of according to claim 1, wherein the casing brake assembly is moved along the filling tube during a complete feeding cycle for producing a single sausage-shaped product.

7. A clipping machine for producing sausage-shaped products, containing a flowable filling material in a tubular or bag-shaped packaging casing, the clipping machine comprises:
   a filling tube for feeding filling material into the tubular or bag-shaped packaging casing stored on the filling tube and being closed at the front end by closure means, like a closing clip;
   a casing brake assembly arranged on the filling tube, for limiting the movement of the tubular or bag-shaped packaging casing while being pulled-off from the filling tube;

gathering means for gathering the filled tubular or bag-shaped packaging casing and for forming a plait-like portion thereto;

a clipping device for placing and closing at least one closure means on the plait-like portion;

the clipping machine further comprises a guide device for reversibly guiding the casing brake assembly along the filling tube in a feeding direction of the filling material during the feeding of the filling material into the tubular or bag-shaped packaging casing, and a control unit adapted to control the movement of the casing brake assembly along the filling tube at least during the feeding of the filling material into the tubular or bag-shaped packaging casing.

* * * * *